(12) United States Patent
Horlacher et al.

(10) Patent No.: US 8,414,945 B2
(45) Date of Patent: *Apr. 9, 2013

(54) METHOD FOR PRODUCING STEROL FORMULATIONS

(75) Inventors: Peter Horlacher, Bellenberg (DE); Dieter Hietsch, Illertissen (DE); Jorg Schwarzer, Hilden (DE); Bernd Jenzer, Balzheim (DE)

(73) Assignee: Cognis IP Management GmbH, Dusseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/517,571

(22) PCT Filed: Nov. 24, 2007

(86) PCT No.: PCT/EP2007/010229
§ 371 (c)(1),
(2), (4) Date: Jun. 4, 2009

(87) PCT Pub. No.: WO2008/067923
PCT Pub. Date: Jun. 12, 2008

(65) Prior Publication Data
US 2010/0068367 A1  Mar. 18, 2010

(30) Foreign Application Priority Data
Dec. 4, 2006 (EP) .................... 06025003

(51) Int. Cl.
*A23C 21/10* (2006.01)
(52) U.S. Cl.
USPC ............. 426/464; 426/74; 426/590; 426/599; 426/518; 426/519; 426/439; 426/489; 426/500
(58) Field of Classification Search .......... 426/518–519, 426/71–74, 615–616, 628, 640, 599, 464, 426/590; 424/439–442, 489, 500
See application file for complete search history.

(56) References Cited

U.S. PATENT DOCUMENTS 6,129,944 A * 10/2000 Tiainen et al. ................. 426/577
6,391,370 B1 * 5/2002 Rogers et al. ................. 426/611
2002/0048606 A1 * 4/2002 Zawistowski ................. 424/489
2004/0047965 A1 * 3/2004 Haindl et al. ................. 426/573
2004/0142087 A1 * 7/2004 Lerchenfeld et al. ......... 426/599
2005/0175672 A1 * 8/2005 Kluetz et al. ................. 424/439
2006/0024352 A1 * 2/2006 Poxon et al. ................. 424/439
2006/0034934 A1 * 2/2006 DeGuise et al. ............. 424/489
2006/0035871 A1 * 2/2006 Auweter et al. ............. 514/169
2006/0121174 A1 * 6/2006 Franke ......................... 426/611
2007/0141224 A1 * 6/2007 Zawistowski ................ 426/611
2009/0004359 A1 * 1/2009 Orikoshi et al. ............. 426/590
2011/0223312 A1 * 9/2011 Perlman ...................... 426/611

FOREIGN PATENT DOCUMENTS

| DE | 10253111 | 5/2004 |
|---|---|---|
| EP | 0897671 | 2/1999 |
| EP | 1003388 | 5/2000 |
| EP | 1148793 | 10/2001 |
| JP | 2004075541 A | 3/2004 |
| WO | 9963841 | 12/1999 |
| WO | 0045648 | 8/2000 |
| WO | 0137681 | 5/2001 |
| WO | 03086468 | 10/2003 |
| WO | 03105611 | 12/2003 |
| WO | 2005049037 | 6/2005 |
| WO | 2005074717 | 8/2005 |
| WO | 2006020980 | 2/2006 |

OTHER PUBLICATIONS

Translation of JP 2004-75541A.*

* cited by examiner

*Primary Examiner* — Drew E Becker
(74) *Attorney, Agent, or Firm* — Servilla Whitney LLC

(57) ABSTRACT

The invention relates to a wet grinding method for producing sterol formulations having good wettability. According to said method, a) an additive selected from the group consisting of proteins, proteinaceous adjuvants, carbohydrates, cellulose derivatives, sugar alcohols, fruit concentrates and vegetable concentrates is dissolved or dispersed in water or in an aqueous suspension medium, b) sterol and/or stanol particles having a median particle size of at least 1 mm are added to this solution/dispersion, c) the dispersion thus obtained is homogenized and size-reduced in a mill that works according to the rotor/stator principle, and d) is then optionally dried, with the proviso that the sterol and/or stanol particles are present in the final formulation with a particle size distribution of $D_{90\%}$ of not more than 50 µm. Owing to their good wettability, the sterol-containing formulations produced according to this method can be incorporated into food items without complex technology and have good organoleptic and sensory properties especially when used in drinks and dairy products.

12 Claims, No Drawings

US 8,414,945 B2

METHOD FOR PRODUCING STEROL FORMULATIONS

CROSS REFERENCE TO RELATED APPLICATIONS

This application is the National Stage entry of PCT/EP2007/010229, filed Nov. 24, 2007,which claims priority to European patent application number EP 06025003, filed Dec. 4, 2006, both of which are incorporated herein by reference in their entireties.

FIELD OF THE INVENTION

The invention is in the field of foods and relates to a method of producing readily wettable phytosterol-containing formulations, the preparations produced according to this method, and also products, in particular foods, which contain these formulations.

BACKGROUND OF THE INVENTION

Numerous possible methods of formulation are known from application technology for being able to incorporate slightly water-soluble phytosterols and phytostanols which are used as cholesterol-lowering agents into food preparations or pharmaceutical products.

Numerous patent applications describe how the availability of sterols can be improved via reducing particle sizes, principally by micronization. For instance, German laid-open application DE 102 53 111 A1 describes pulverulent phytosterol formulations having a median particle size of 0.01 to 100 µm which may be readily redispersed in water. Preferably, use is made of hydrophilic auxiliaries as protective colloids. For producing the powders, use is made of organic solvents to the disadvantage of ecology and acceptability. International application WO 2005/074717 A1 also uses a type of protective colloid by embedding sterols into a matrix which contains proteins and carbohydrates. The total sterol content in the formulation, however, is small, owing to the high fraction of auxiliaries.

A further method for producing a sterol dispersion in which the particle size distribution of the sterols is from 0.1 to 30 µm, may be found in the international applications WO 03/105611 and WO 2005/049037. As in this method, frequently micronization of the sterol particles alone is insufficient in order to achieve good incorporability. Although the bioavailability of the finely dispersed particles may be improved by increasing the surface area, especially the micronized particles are poorly wettable, aggregate readily and generally float on aqueous surfaces. Frequently, the ground sterol can only be dispersed in a drink using special methods, for which intense mixing is necessary. However, these apparatuses are not usually available to the end user, the food manufacturer.

Therefore, many manufacturers combine micronization of sterols with the additional use of emulsifiers. An example thereof are the preparations claimed in European patent EP 0897671 B1 having sterols and sterol esters having a particle size of a maximum of 15 µm in a mixture with selected emulsifiers, wherein the weight ratio of emulsifier to sterol in the aqueous phase is less than 1:2.

In the international patent application WO 03/086468 A1, pulverulent sterol ester formulations having a low protein content and mono- and diglycerides as emulsifiers are disclosed. Even if these are distinguished by good acceptability and have already been known as food emulsifiers over a long time period, attempts are made to decrease the amount of the emulsifiers, or even to avoid them completely, since emulsifiers also affect the bioavailability of other substances present in the foods or can adversely affect the stability of the formulations.

Other methods of improving the solubility and dispersibility, such as formulation as emulsions, microemulsions, dispersions, suspensions or complexing with cyclodextrins or bile salts are presented in international patent application WO 99/63841 A1. Proposed supports are PEG, PVP, copolymers, cellulose ethers and cellulse esters. Also, direct use of food base materials as supports for pulverized sterols in the form of a premix is disclosed by EP 1 003 388 B1. The selection of proteins as support substances for non-esterified sterols and stanols is disclosed in WO 01/37681.

In particular, processing non-esterified sterols and stanols which are still very much more hydrophobic than their esterified derivatives makes high demands on the production method. Free ground sterols in addition, have the disadvantage that they have a low minimum ignition energy (MIE<3 mJ), and therefore these products are categorized as extremely sensitive to ignition. Therefore, when free sterols are used, corresponding safety precautions must be heeded.

A possible method of producing sterol-containing microparticles can be found in European patent EP 1148793 B1. It is based on high-energy homogenization. However, a powder produced thereby based on aqueous suspension media has an inadequate homogeneity and can only be redispersed with difficulty. A disadvantage of many sterol-containing powder formulations is the agglomeration behavior of the free sterols on storage. During storage, especially if they are stored under pressure, severe clumping or lump formation is observed, and the solid uncontrolled agglomerates must again be comminuted in order then to be able to be processed.

In the international patent application WO 2006/020980A1, agglomerates of sterol particles are described. The production method is a size-enlargement granulation of adhesive granules in which the micronized sterol particles are wetted with a suspension medium in which a binder is in part or completely dissolved. The suspension medium is removed after the wetting, in such a manner that the remaining agglomerates have a size of 150 to 850 µm. This method requires a high use of apparatus and must be controlled very precisely, in order that the agglomerates produced have the desired stability.

It was an object of the present invention to provide sterol-containing formulations having a high content of sterols and/or stanols, which may be produced using simple and rapid processes, and enable good and rapid dispersion and incorporation of non-esterified sterols and/or stanols in foods, wherein the formulations should have good sensory and organoleptic properties in the foods.

DETAILED DESCRIPTION OF PREFERRED EMBODIMENTS

The invention relates to a wet grinding method for producing readily wettable sterol formulations, in which a) an additive is selected from the group which is formed by proteins, protein-containing auxiliaries, carbohydrates, cellulose derivatives, sugar alcohols, fruit concentrates and vegetable concentrates dissolved or dispersed in water or an aqueous suspension medium b) to this solution/dispersion is added sterol particles and/or stanol particles having a median particle size of at least 1 mm, c) the resultant dispersion is homogenized and comminuted in a mill which operates by the rotor-stator principle and
d) is if appropriate subsequently dried,
with the proviso that the sterol particles and/or stanol particles are present in the final formulation in a particle size distribution having a $D_{90}\%$ of a maximum of 50 µm.

The method according to the invention enables powders also to be produced with free non-esterified sterols and stanols which enable easy further processing of the the lipophilic active ingredients without great requirements of apparatus and at room temperature in foods, in particular drinks. The powder has a low agglomeration tendency and therefore good flow properties. It is distinguished by good homogeneity and, owing to its improved wettability, can be further processed without great technical resources, wherein a homogeneous distribution in the final formulation is also rapidly achieved. Owing to the coating of the sterol surface with the hydrophilic additives, the organoleptic properties and the sensory properties are decisively improved. The coated powder does not stick to teeth and oral mucosa, and therefore the unpleasant sterol taste which leads to considerable taste impairments in foods containing the active ingredients is completely suppressed.

By using hydrophilic additives such as proteins, protein-containing auxiliaries, carbohydrates, sugar alcohols, fruit concentrates and vegetable concentrates, not only are solubilization properties and dispersion properties improved, but surprisingly these powders also exhibit an increased storage stability compared with pure ground sterols which have a high agglomeration tendency.

The method allows organic solvents or heating the formulation to be avoided in the processing of non-esterified sterols and stanols, and despite the aqueous medium, allows the omission of emulsifiers having a high surface activity, especially of the type of lecithins, monoglycerides, diglycerides, polysorbates, sodium stearyl lactylate, glycerol monostearate, lactic acid esters and polyglycerol esters. The low emulsifying properties of the hydrophilizing auxiliaries, in particular the caseinates, the milk powder or the gum arabic are sufficient in order to ensure the homogeneity of the powder which is produced and ready redispersibility and processability. The omission of further emulsifiers simplifies the further processing by reducing possible incompatibilities with other food constituents and decreases the occurrence of incompatibilities with the consumer.

A particular advantage of the method is carrying out grinding and coating in one operating step. The use of the wet grinding method for comminuting the sterol particles avoids the high risk of powder explosions. The particle size of the sterols and/or stanols initially used is relatively high in order to avoid firstly powder explosions and secondly to ensure good handling. Thus finished prills, which have a very high storage stability, can be used. Preferably, the mean particle sizes are greater than 1 mm. At this size, the particle size determination is carried out by conventional sieve analysis. The sterol particles and/or stanol particles in the final formulation are, after the wet grinding, present in a particle size distribution having a $D_{90\%}$ of a maximum of 50 µm, preferably a maximum of 40 µm, and particularly preferably a maximum of 30 µm. The particle size distribution was determined using an instrument from Beckman Coulter, type LS 230 and calculated as volume distribution. The measurement was performed in aqueous suspension.

In order to keep the processing requirement low, the time required for grinding which leads to this degree of comminution should be a maximum of 2 hours, preferably a maximum of 1 hour. The process generally proceeds at <2-3 bar (<43.5 psi). And pasty to compacted masses can also be processed.

The mill which is to be used in this case is based on a rotor-stator principle. Toothed colloid mills, but also Ultra-Turrax, corundum mills, perforated disk mills or ring ball mills in which the balls are situated in the gap between rotor and housing, are suitable for the method according to the invention. Toothed colloid mills have proved to be particularly advantageous. On the basis of the observation that the energy input on grinding must have a magnitude which firstly permits sufficient comminution without extreme heating of the material to be ground and secondly should lead to a low charging of the particles, these mills have proved to be particularly suitable. Shearing forces which are exerted by high-performance mills, as are known from European patent EP 1148793 B1 for the comminution of sterols, are not acceptable for good storage stability without clump formation of the particles. They have, in addition, proved to be disadvantageous for uniform surface coating by the hydrophilizing additives.

The expenditure on apparatus of the production equipment according to the invention is therefore very low. Cooling of the material to be ground during grinding can be omitted, the thermal stress of the material is low. In addition, the risk of dust explosions is reduced to very low levels by the use of wet grinding.

It is possible by using the wet grinding method according to the invention to produce powders having a very high sterol content having the above described advantageous properties, wherein the use of organic solvents and heating of the sterol particles is avoided. The aqueous dispersions have concentrations of sterols and stanols of at least 20% by weight, preferably at least 30% by weight, and particularly preferably at least 40% by weight, and especially at least 50% by weight, based on the total weight of the dispersion.

These dispersions are preferably dried. For this, the conventional drying methods such as vacuum drying or spray drying are suitable. Since the additives are only used for hydrophilization and the surfaces of the sterols are coated therewith, the total content of sterols in the powders is very high. The powder resulting after drying actually contains at least 75% by weight, particularly preferably at least 85% by weight, and in particular at least 90% by weight of sterols and/or stanols, based on the weight of the dried powders.

Powders having sterol/stanol contents of at least 90% which may be produced by this method are therefore—just on the basis of the sterol content—comparable with ground or micronized sterols/stanols. Compared with these ground or micronized sterols/stanols, the powders according to the invention, however, are distinguished by the following advantages: they are more free-flowing and may be easily dispersed in water without applying high shear forces. Enterprises carrying out further processing such as, for example, dairies, can therefore use their routine agitators for incorporation into foods.

The good water dispersibility is surprising in that the amount of support (max. 10%) at the particle size of a maximum of 50 µm is not sufficient to coat all particles (e.g.: if, for a 50 µm particle (surface area of 0.0079 $mm^2$/particle) approximately 63% support is required in order to obtain a 10 µm thick coating; for 30 µm particles this is already around 78% of support material.

In addition, the powders may be stored without lump formation and caking. Ground sterols have a very high tendency to caking. This leads to the fact that after relatively long storage a block is obtained which must be comminuted by powerful application of force before it can be used. In addition, the storage becomes safer owing to the increased minimum ignition energy. In the case of the ground sterols and stanols, this has a very low value of 1 mJ>MIE<3 mJ.

The preparations according to the invention are markedly safer here even at a low amount of support (10%): 3 mJ>MIE<10 mJ.

The sterol content of the final formulation is dependent on the amount of the hydrophilic additive used. A weight ratio of additive to sterol fraction/stanol fraction of 1:3 to 1:20 is advantageous, preferably 1:9 to 1:15, and particularly preferably to 1:14 to 1:16.

Also, compared with dispersions, the powders have the advantage that, firstly, the content of active substance is very much greater, the storage stability is decisively improved and—especially in the case of aqueous media—the microbiological stability is markedly increased.

Owing to the low fraction of support, only slight changes and effects of the final recipe are to be expected. This is in contrast to a dispersion, for which the medium/matrix (oil, milk, fatty cream) has a not insignificant effect, owing to the high amount of matrix.

The sterol-containing formulations produced by these methods can be incorporated in a simple manner into foods, in particular into milks, milk drinks, whey drinks, yoghurt drinks, margarine, fruit juices, fruit juice mixtures, fruit juice drinks, vegetable juices, carbonated and non-carbonated drinks, soymilk drinks or protein-rich liquid food replacement drinks, and also fermented milk preparations, yoghurt, drinking yoghurt or cheese preparations, but also into pharmaceutical preparations.

If the additive used is fruit concentrate or vegetable concentrate, two method variants are possible: in one variant the fruit concentrate or vegetable concentrate (alternatively fruit puree or vegetable puree or fruit pulp or vegetable pulp) can be dispersed in advance in the suspension medium and thus diluted (step a)). In the other variant, fruit concentrate or vegetable concentrate can be used directly as suspension medium for the sterols and/or stanols, so and only the sterols and/or stanols are added to the concentrates, and the resultant dispersion can be comminuted and homogenized in the rotor-stator mill. Further additives listed in step a) are not then required.

The resultant formulations have a high content of sterols and/or stanols. They generally have a yield point, they are therefore solid, but may be liquefied again by shearing, so that they can be further processed by simple means directly in final food formulations.

The invention further relates, therefore, to fruit concentrates and vegetable concentrates which contain at least 1% by weight, preferably at least 5% by weight, and particularly preferably at least 15% by weight, of sterols and/or stanols, based on the concentrates. These concentrates have a water content of a maximum of 85% by weight, preferably a maximum of 75% by weight, and particularly preferably a maximum of 65%, in order to have the consistency which is advantageous for further processing. The sterol particles and/or stanol particles present therein have a particle size distribution having a $D_{90\%}$ of a maximum of 50 μm, preferably a maximum of 40 μm, and particularly preferably a maximum of 30 μm.

The invention further relates to food preparations which contain sterol/stanol formulations of said composition. They are used preferably in drinks and milk products which contain 0.1 to 50% by weight, preferably 1 to 20% by weight, of the pulverulent coated preparations based on the total weight of the foods.

Sterol and/or Stanol

In the present invention, sterols obtained from plants and plant raw materials, termed phytosterols and phytostanols, are used. Known examples are ergosterol, brassicasterol, campesterol, avenasterol, desmosterol, clionasterol, stigmasterol, poriferasterol, chalinosterol, sitosterol and mixtures thereof, among these, use is preferably made of β-sitosterol and campesterol. Likewise, the hydrogenated saturated forms of the sterols, termed stanols, come under the compounds used, and here also β-sitostanol and campestanol are preferred. As plant raw material sources, there serve, inter alia, seeds and oils of soybeans, canola, palm kernels, corn, coconut, rape, sugarcane, sunflower, olive, cotton, soybean, peanut or products from tall oil production.

Protein-Containing Auxiliaries and/or Proteins

Protein-containing auxiliaries and proteins used are preferably milk powder and/or whey powder and/or casein and/or caseinates. Milk powders such as commercially obtainable whole milk and skimmed milk powders which have been obtained from the respective milk quality grades by drying are particularly suitable. They can be used in mixtures with other proteins or as sole support. If other proteins are added or proteins are used instead of milk powder as support, these are taken to include isolated proteins which are obtained from natural animal and plant sources and are added during production of the pulverulent preparations. Possible sources of proteins are plants such as wheat, soybean, lupin, corn or sources of animal origin such as eggs or milk.

Skimmed milk powder, in the context of the present invention, is particularly preferred since it has sufficient hydrophilizing properties without therefore also simultaneously exhibiting the disadvantages of such food emulsifiers described at the outset, which are otherwise customarily used especially for producing drinks and milk products, especially fermentation products such as yoghurt. In addition, skimmed milk powder best masks the typical unpleasant sterol flavor and formulations having this additive have improved sensory properties compared with other auxiliaries.

Carbohydrates

The compounds used as carbohydrates comprise all polysaccharides and monosaccharides which are suitable as foods, such as, for example, glucose, sucrose, fructose, trehalose, maltose, maltodextrin, cyclodextrin, invert sugar, palatinose, lactose, guar gum, xanthan, pectins, starch, starch derivatives and modified starch, alginates, carrageenan, wheat gluten and gum arabic. Preferably, use is made of gum arabic, galactomannans such as guar gum, xanthan, starch and starch derivatives and modified starches (OSA starch) as carbohydrate, particular preference is given to gum arabic.

Further Auxiliaries

As further auxiliaries, the preparations according to the invention can contain antioxidants, preservatives and flow enhancers. Examples of possible antioxidants or preservatives are tocopherols, lecithins, ascorbic acid, parabens, butylated hydroxytoluene or butylated hydroxyanisole, sorbic acid or benzoic acid and salts thereof. Preferably, tocopherols are used as antioxidants.

As flow regulator and improver, silicon dioxide can be used.

EXAMPLES

Example 1

2400 g of deionized water were charged into the funnel of a Fryma mill (Fryma, Rheinfelden, type MZ 80 R, gap width: 240 μm), therein were dispersed 120 g of skimmed milk powder (spray dried skimmed milk powder ADPI grade, supplier: Almil, Bad Homburg) and the dispersion was homogenized for circulation at 4 U. 1800 g of sterol mixture (tall oil/rape sterol 70/30, prills ~2 mm) were added. The gap was slowly closed (minimal setting and the mixture was homogenized in circulation for 30 min. In this case the temperature increased from 24° C. to 53° C.

One part of the resultant dispersion was dried in a vacuum at 60°/1 mbar. Subsequently, the particle size distribution of the vacuum-dried powder was measured by laser diffractometry (Beckman Coulter, type LS 320). This gave a $D_{90\%}$ of 25 µm.

A further part was spray dried (APV Anhydro type 3 S spray drying system (2-fluid nozzle: 3 mm, Anhydro) temperature at the inlet: 185° C., temperature at the outlet: 90° C., pressure 2 bar).

Example 2

2700 g of deionized water were charged into the funnel of a Fryma mill (Fryma Rheinfelden, type MZ 80 R, gap width: 240 µm), and therein were dispersed 138 g of gum arabic (total solids 94%) and the dispersion was homogenized in circulation at 4 U. 2000 g of sterol mixture (tall oil/rape sterol 70/30, prills ~2 mm) were added. The gap was slowly closed (minimum setting) and the mixture was homogenized in circulation for 30 min.

One part of the resultant dispersion was dried in a vacuum at 60°/1 mbar, a further part was spray dried (APV Anhydro type 3 S spray-drying system).

Subsequently, the particle size distribution of the vacuum-dried powder was measured by laser diffractometry (Beckman Coulter, type LS 320). This gave a $D_{90\%}$ of 24 µm.

Example 3

Wet milling of sterols with coating and subsequent spray drying:

3055 g of water were charged at room temperature into the funnel of a toothed colloid mill (Fryma/type MZ 80 R). With the gap open (position 0.9) the mill was started and 195 g of skimmed milk powder were added and suspended and dissolved in circulation. 1750 g of phytosterol (tall oil/rape sterol 70/30, prills 1-2 mm) were slowly added and mixed in.

The mill gap was gradually closed (end: position 0.0). At the end position milling was continued for a further 30 min in circulation. (Circulation pump throughput 5 l/min/final temperature 48° C.). The thixotropic homogeneous dispersion obtained is subsequently spray dried (APV Anhdro type 3 S spray-drying system).

Example 4

Wet grinding of sterols in fruit pulp:

3440 g of mango puree (Döhler, water content 70%) were charged into the funnel of a toothed colloid mill (Fryma/type MZ 80 R) at room temperature. With the gap open (position 0.9), the mill was started and the mango puree was passed/milled in circulation. 640 g of phytosterol (tall oil/rape sterol 70/30, prills 1-2 mm) were slowly added and mixed in. The mill gap was gradually closed (end: position 0.0). At the end position, milling was continued for a further 30 min in circulation. (Circulation pump throughput 3 l/min/final temperature 47° C.)

This resulted in a homogeneous fruit paste having a very finely ground sterol fraction. The product had a yield point, but became liquid again on shaking. The fruit paste is therefore outstandingly suitable for incorporation into cloudy fruit juices/fruit drinks. The sterol fraction can be introduced without problem in this manner without the interfering hydrophobic properties of conventional sterol powders. The very finely ground sterol particles are not perceived optically in the fruit juice (no creaming/color difference). The mouth feel of the wet milled sterol particles in the fruit juice is neutral, as was sought after.

Dispersion Test

The resultant powders were dispersed in milk and water in comparison with milled sterols of comparable particle size distribution. For this, approximately 250 ml of the liquid under test were placed in a glass beaker and stirred (approximately 100 rpm). To the stirred liquid were added 2.5 g of the respective powder and the dispersion behavior was assessed.

The coated sterol could be very readily dispersed in cold (15° C.) and hot (60° C.) water and also in milk (18° C.), whereas the untreated sterol was dispersed poorly and owing to the hydrophobic surface remained on the liquid surface.

The sensory assessment found that the encapsulated sterols in water had a neutral taste and did not stick to gums and the oral cavity, whereas the untreated powder stuck to the oral mucosa and, in addition to a typically adverse sterol taste, left an unpleasant sensory feeling.

The resultant powders are distinguished by improved free-flowing behavior, improved stirrability into water and a higher bulk weight compared with conventional finely ground sterols. The dried products have a sterol content of greater than 90%. In Example 1, the sterol content of the dried powder is 93%. The powders may be introduced by simple stirring into aqueous systems such as water, juices, milk etc.

The dispersions have a yield point, may be readily stirred and can be added simply to aqueous systems such as cold water, juices, milk etc.

The invention claimed is:

1. A wet grinding method for producing readily wettable sterol formulations, comprising:
    a) providing an additive dispersion or solution in water or an aqueous suspension medium, said additive being selected from the group consisting of proteins, protein-containing auxiliaries, carbohydrates, cellulose derivatives, sugar alcohols, fruit concentrates and vegetable concentrates,
    b) adding free sterol particles and/or stanol particles having a median particle size of at least 1 mm to form a sterol/stanol particle dispersion,
    c) homogenizing and comminuting said sterol/stanol particle dispersion in a mill which operates by the rotor-stator principle, and
    d) drying to obtain formulations in the form of a powder, with the proviso that the free sterol particles and/or stanol particles in the readily wettable sterol formulations have a particle size distribution $D_{90\%}$, of less than or equal to 50 µm, said particles of the formulations in the form of a powder are readily wettable and the formulations have a free sterol content of at least 75% by weight.

2. The wet grinding method for producing readily wettable sterol formulations of claim 1, wherein said protein or said protein-containing auxiliary is selected from the group consisting of milk powder, whey powder, casein, caseinates, and combinations thereof.

3. The wet grinding method for producing readily wettable sterol formulations of claim 1 wherein said additive is selected from the group of carbohydrates consisting of glucose, sucrose, fructose, trehalose, maltose, maltodextrin, cyclodextrin, invert sugar, palatinose, lactose, guar gum, xanthan, pectins, starch, starch derivatives, modified starches, alginates, carrageenan, wheat gluten and gum arabic.

4. The wet grinding method for producing readily wettable sterol formulations of claim 1 wherein said additive comprises gum arabic or skimmed milk powder.

5. The wet grinding method for producing readily wettable sterol formulations of claim 1, wherein said mill used in step c) is a toothed colloid mill.

6. The wet grinding method for producing readily wettable sterol formulations of claim 1 wherein the weight ratio of additive to sterol/stanol fraction is from 1:3 to 1:20.

7. The wet grinding method for producing readily wettable sterol formulations of claim 1, wherein the formulations are free of a high surface activity emulsifier.

8. The wet grinding method for producing readily wettable sterol formulations of claim 1, wherein the free sterol content is greater than 85% by weight.

9. The wet grinding method for producing readily wettable sterol formulations of claim 8, wherein the free sterol content is greater than 90% by weight.

10. A wet grinding method for producing readily wettable sterol formulations, comprising:
   a) providing an aqueous suspension medium, consisting of a fruit concentrate or a vegetable concentrate,
   b) adding free sterol particles and/or stanol particles having a median particle size of at least 1 mm, to form a sterol/stanol particle dispersion,
   c) homogenizing and comminuting said sterol/stanol particle dispersion in a mill which operates by the rotor-stator principle, and
   d) drying to obtain formulations in the form of a powder, with the proviso that the free sterol particles and/or stanol particles in the readily wettable sterol formulations have a particle size distribution, $D_{90\%}$, of less than or equal to 50 μm, said particles of the formulations in the form of a powder are readily wettable and the formulations have a free sterol content of at least 75% by weight.

11. The wet grinding method for producing readily wettable sterol formulations of claim 10, wherein the formulations are free of a high surface activity emulsifier.

12. The wet grinding method for producing readily wettable sterol formulations of claim 10, wherein the free sterol content is greater than 85% by weight.

* * * * *

UNITED STATES PATENT AND TRADEMARK OFFICE
CERTIFICATE OF CORRECTION

| | | Page 1 of 1 |
|---|---|---|
| PATENT NO. | : 8,414,945 B2 | |
| APPLICATION NO. | : 12/517571 | |
| DATED | : April 9, 2013 | |
| INVENTOR(S) | : Peter Horlacher et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Second Day of December, 2014

Michelle K. Lee
*Deputy Director of the United States Patent and Trademark Office*